United States Patent
Kim et al.

(10) Patent No.: US 12,095,039 B2
(45) Date of Patent: Sep. 17, 2024

(54) ALL-SOLID SECONDARY BATTERY

(71) Applicant: Samsung SDI Co., Ltd., Yongin-si (KR)

(72) Inventors: Jinkyu Kim, Yongin-si (KR); Kyulin Lee, Yongin-si (KR); Jeonghye Lee, Yongin-si (KR); Byeonggyu Cho, Yongin-si (KR); Sangil Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 61 days.

(21) Appl. No.: 17/249,237

(22) Filed: Feb. 24, 2021

(65) Prior Publication Data

US 2021/0265665 A1    Aug. 26, 2021

(30) Foreign Application Priority Data

Feb. 25, 2020   (KR) .................. 10-2020-0022999

(51) Int. Cl.
| | |
|---|---|
| *H01M 10/0585* | (2010.01) |
| *H01M 4/587* | (2010.01) |
| *H01M 4/62* | (2006.01) |
| *H01M 10/0525* | (2010.01) |
| *H01M 10/0562* | (2010.01) |
| *H01M 4/02* | (2006.01) |

(52) U.S. Cl.
CPC ....... *H01M 10/0585* (2013.01); *H01M 4/587* (2013.01); *H01M 4/622* (2013.01); *H01M 10/0525* (2013.01); *H01M 10/0562* (2013.01); *H01M 2004/021* (2013.01); *H01M 2004/027* (2013.01); *H01M 2300/008* (2013.01)

(58) Field of Classification Search
None
See application file for complete search history.

(56) References Cited

U.S. PATENT DOCUMENTS

| | | |
|---|---|---|
| 6,482,547 B1 | 11/2002 | Yoon et al. |
| 8,388,922 B2 | 3/2013 | Sotowa et al. |
| 8,906,555 B2 | 12/2014 | Hwang et al. |
| 10,103,406 B2 | 10/2018 | Goh et al. |
| 2010/0297501 A1 | 11/2010 | Seki et al. |

(Continued)

FOREIGN PATENT DOCUMENTS

| | | |
|---|---|---|
| CN | 102290572 A | 12/2011 |
| CN | 104106160 A | 10/2014 |

(Continued)

OTHER PUBLICATIONS

EPO EESR dated Jun. 23, 2021 issued in corresponding EP Patent Application No. 21159401.5, 5 pages.

(Continued)

*Primary Examiner* — Wyatt P McConnell
(74) *Attorney, Agent, or Firm* — Lewis Roca Rothgerber Christie LLP

(57) ABSTRACT

An all-solid secondary battery includes a cathode; an anode including natural graphite; and a solid electrolyte layer between the cathode and the anode, wherein the natural graphite has an average particle diameter (D50) in a range of greater than about 10 μm to about 20 μm or less and includes an amorphous carbon coating layer.

16 Claims, 7 Drawing Sheets

(56) References Cited

U.S. PATENT DOCUMENTS

| | | | | |
|---|---|---|---|---|
| 2011/0003211 | A1* | 1/2011 | Hudson | H01M 4/131 |
| | | | | 429/304 |
| 2014/0227588 | A1* | 8/2014 | Kim | H01M 4/625 |
| | | | | 429/188 |
| 2014/0356707 | A1 | 12/2014 | Kwon et al. | |
| 2016/0141713 | A1 | 5/2016 | Suzuki et al. | |
| 2016/0156064 | A1* | 6/2016 | Miyashita | C01B 25/14 |
| | | | | 429/323 |
| 2018/0277901 | A1* | 9/2018 | Mochizuki | H01M 10/0562 |
| 2019/0190007 | A1 | 6/2019 | Seong et al. | |
| 2019/0305293 | A1 | 10/2019 | Sotowa et al. | |
| 2020/0044283 | A1 | 2/2020 | Okamoto et al. | |
| 2020/0052327 | A1 | 2/2020 | Osada | |
| 2020/0411843 | A1* | 12/2020 | Song | H01M 4/133 |

FOREIGN PATENT DOCUMENTS

| | | |
|---|---|---|
| CN | 110249467 A | 9/2019 |
| CN | 110828889 A | 2/2020 |
| EP | 2 790 252 A1 | 10/2014 |
| EP | 2 913 299 A1 | 9/2015 |
| JP | 1999-354122 A | 12/1999 |
| JP | H 11354122 A | 12/1999 |
| JP | 2001-135356 A | 5/2001 |
| JP | 2003-346786 A | 12/2003 |
| JP | 2010-272380 A | 12/2010 |
| JP | 2011-023221 A | 2/2011 |
| JP | 2014-107029 A | 6/2014 |
| JP | 2014-232728 A | 12/2014 |
| JP | 2015-513185 A | 4/2015 |
| JP | 2016-091762 A | 5/2016 |
| JP | 2016-100069 A | 5/2016 |
| JP | 2018-125150 A | 8/2018 |
| JP | 2019-114525 A | 7/2019 |
| JP | 2020-027701 A | 2/2020 |
| KR | 10-2008-0040049 A | 5/2008 |
| KR | 10-2010-0120919 A | 11/2010 |
| KR | 10-1583639 B1 | 1/2016 |
| KR | 10-2016-0047310 A | 5/2016 |
| KR | 10-2017-0126493 A | 11/2017 |
| KR | 10-2019-0004380 A | 1/2019 |
| KR | 10-2019-0136382 A | 10/2023 |

OTHER PUBLICATIONS

Internet: Anton Paar, Particle size and zeta potential of electrode materials: better characterization, better performance, www.anton-paar.com, 5 pps.

Dubasova, et al., Capacity Characteristics of Carbon Anodic Materials Based on Russian Natural Graphite for Lithium-Ion Batteries, Russian Journal of Electrochemistry 2013, vol. 49, No. 2, pp. 161-175 © Pleiades Publishing Ltd., 15 pps.

Hou, et al., Structure and Performance of Spherical Natural Graphite Modified by Ag-C Double Coating, Int. J. Electrochem Sci, 12 (2017), pp. 3652-3661.

Li, et al., Scalable synthesis of a novel structured graphite/silicon/pyrolyzed-carbon composite as anode material for high-performance lithium-ion batteries, Journal of Alloys and Compounds 688 (2016) pp. 1072-1079.

Notice of Opposition for JP Application No. 2023-701199, dated Nov. 20, 2023, 33 pages.

China First Office Action, Application No. 202110212549 7; Issuing No. 2024020100042470; Issue Date Feb. 1, 2024 8 pps. (English Translation 10 pps.).

Japanese Office action issued Feb. 15, 2022, in corresponding JP Patent Application No. 2021-028850 (5 pages).

* cited by examiner

ALL-SOLID SECONDARY BATTERY

CROSS-REFERENCE TO RELATED APPLICATION

This application claims priority to and the benefit of Korean Patent Application No. 10-2020-0022999, filed on Feb. 25, 2020, in the Korean Intellectual Property Office, the entire content of which is incorporated by reference.

BACKGROUND

1. Field

One or more aspects of embodiments of the present disclosure relate to an all-solid secondary battery.

2. Description of the Related Art

Lithium secondary batteries utilizing a liquid electrolyte in the related art have had stability problems owing to easy ignition upon exposure to moisture in the air. Such stability issues have become more important as electric cars have become more popular. In order to improve safety, thorough research is ongoing into all-solid secondary batteries utilizing a solid electrolyte composed of an inorganic material. All-solid secondary batteries having improved stability, high energy density, high power output, long life, simple manufacturing processes, large/small sizes, and/or low prices are receiving attention as next-generation secondary batteries.

An all-solid secondary battery includes a cathode, a solid electrolyte, and an anode, and the solid electrolyte has high ionic conductivity and low electronic conductivity. Non-limiting examples of the solid electrolyte of the all-solid secondary battery include a sulfide-based solid electrolyte and/or an oxide-based solid electrolyte. The sulfide-based solid electrolyte may be activated when being pressed under high-temperature and high-pressure conditions. However, an interface (interfacial) resistance may significantly increase during the pressing due to a spring back phenomenon, which may negatively impact battery capacity.

Also, an electrode plate of the all-solid secondary battery includes an active material and a solid electrolyte, and an interfacial resistance between the active material and the solid electrolyte may be the most significant cause that deteriorates battery performance.

Studies on application of pressure to reduce the interfacial resistance have been conducted, but the effects have not been suitable.

Therefore, there is a high need for research to reduce the interfacial resistance.

SUMMARY

One or more aspects of embodiments of the present disclosure are directed toward an all-solid secondary battery having a novel structure.

Additional aspects will be set forth in part in the description which follows and, in part, will be apparent from the description, or may be learned by practice of the presented embodiments of the disclosure.

One or more embodiments of the present disclosure provide an all-solid secondary battery including:
 a cathode;
 an anode; and
 a solid electrolyte layer between the cathode and the anode,
wherein the anode includes natural graphite, and
 the natural graphite has an average particle diameter (D50) in a range of greater than about 10 μm to about 20 μm or less, and includes an amorphous carbon coating layer.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
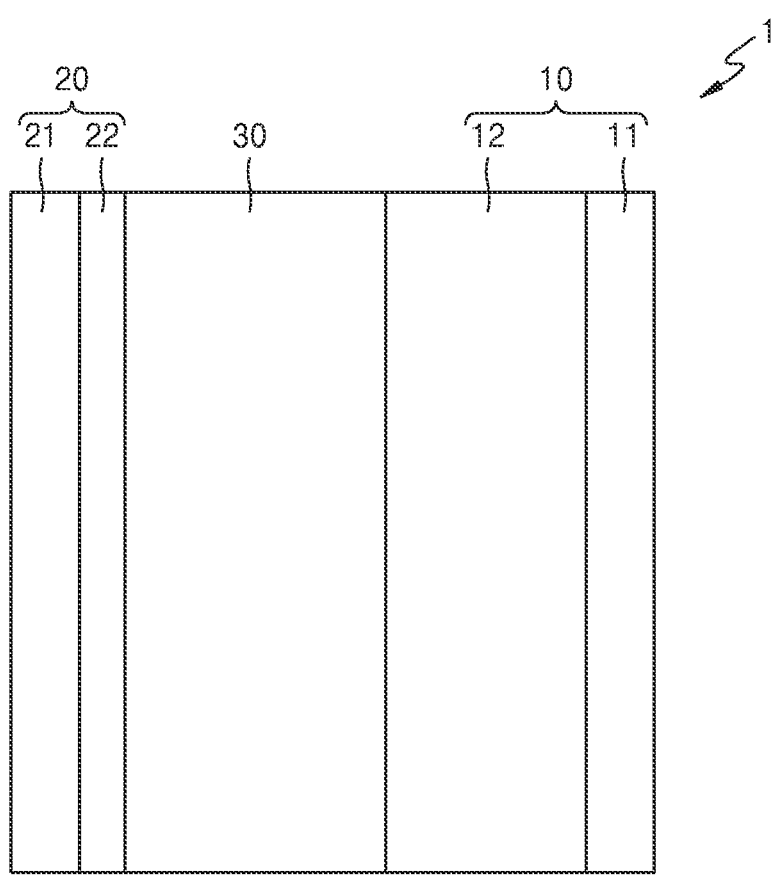
FIG. 1 shows a structure of an all-solid secondary battery according to an embodiment.

Reference will now be made in more detail to embodiments, examples of which are illustrated in the accompanying drawings. In this regard, the present embodiments may have different forms and should not be construed as being limited to the descriptions set forth herein. Accordingly, the embodiments are merely described below, by referring to the drawings, to explain aspects of the present description. As utilized herein, the term "and/or" includes any and all combinations of one or more of the associated listed items. Expressions such as "at least one of," "one of," and "selected from," when preceding a list of elements, modify the entire list of elements and do not modify the individual elements of the list.

Hereinafter, as the present disclosure allows for various suitable changes and numerous embodiments, selected embodiments will be illustrated in the drawings and described in more detail in the written description. However, this is not intended to limit the present disclosure to particular modes of practice, and it is to be appreciated that all changes, equivalents, and substitutes that do not depart from the spirit and technical scope are encompassed in the present disclosure.

The terms used herein are merely used to describe selected embodiments, and are not intended to limit the present disclosure. An expression used in the singular encompasses the expression of the plural, unless it has a clearly different meaning in the context. As used herein, it is to be understood that the terms such as "including," "having," and "comprising" are intended to indicate the existence of the features, numbers, steps, actions, components, parts, ingredients, materials, or combinations thereof disclosed in the specification, and are not intended to preclude the possibility that one or more other features, numbers, steps, actions, components, parts, ingredients, materials, or combinations thereof may exist or may be added. The symbol "/" used herein may be interpreted as "and" or "or" according to the context.

As used herein, the singular forms "a," "an," and "the" are intended to include the plural forms as well, unless the context clearly indicates otherwise. Further, the use of "may" when describing embodiments of the present disclosure refers to "one or more embodiments of the present disclosure".

In the drawings, the thicknesses of layers and regions may be exaggerated or reduced for clarity. Like reference numerals in the drawings denote like elements, and duplicative descriptions thereof may not be provided. Throughout the specification, it will be understood that when a component, such as a layer, a film, a region, or a plate, is referred to as being "on" another component, the component may be directly on the other component or intervening components may be present therebetween. When an element is referred to as being "directly on" another element, there are no intervening elements present. Throughout the specification, while such terms as "first," "second," etc., may be used to describe one or more suitable components, such components must not be limited to the terms. The terms are utilized only to distinguish one component from another.

Hereinafter, according to one or more embodiments, an all-solid secondary battery will be described in more detail.

According to an embodiment, an all-solid secondary battery includes a cathode; an anode; and a solid electrolyte layer between the cathode and the anode, wherein the anode includes natural graphite, and the natural graphite has an average particle diameter (D50) in a range of greater than about 10 μm to about 20 μm and includes an amorphous carbon coating layer.

The natural graphite may be or include crystalline carbon. When the natural graphite, which is crystalline carbon, includes the amorphous carbon coating layer, the mobility of Li ions may increase, and side reactions may be suppressed or reduced.

When the natural graphite having an average particle diameter within the above range and including an amorphous carbon coating layer is utilized as an anode active material, resistance between the anode active material and the solid electrolyte may be low even when a high pressure is applied thereto, and thus the battery may have a high battery capacity.

In some embodiments, the natural graphite may be (e.g., may include, or may have the form of) spherical secondary particles obtained by assembling flake graphite primary particles (e.g., spherical secondary particles that are an assembly of flake graphite primary particles).

In some embodiments, an average particle diameter (D50) of the natural graphite may be in a range of about 14 μm to about 20 μm. For example, an average particle diameter (D50) of the natural graphite may be in a range of about 14 μm to about 18 μm, or an average particle diameter (D50) of the natural graphite may be in a range of about 14 μm to about 17 μm.

When the average particle diameter (D50) of the natural graphite is out of these ranges, and for example, less than about 14 μm or greater than about 20 μm, mobility of Li ions may be limited, which may result in capacity reduction and/or deterioration of the rate characteristics of the battery.

In some embodiments, a pellet density of the natural graphite may be about 1.9 g/cm$^3$ or higher. For example, a pellet density of the natural graphite may be in a range of about 1.9 g/cm$^3$ to about 2.5 g/cm$^3$.

When the pellet density of the natural graphite is out of these ranges, and for example, lower than about 1.9 g/cm$^3$, battery capacity characteristics may be poor or unsuitable, and for example when a pellet density of the natural graphite is higher than about 2.5 g/cm$^3$, lithium ions may not be easily absorbed or desorbed.

In some embodiments, an aspect ratio of the natural graphite may be in a range of about 0.5 to about 2. For example, an aspect ratio of the natural graphite may be in a range of about 0.7 to about 1.4. For example, an aspect ratio of the natural graphite may be in a range of about 0.7 to about 1.3. For example, an aspect ratio of the natural graphite may be in a range of about 0.8 to about 1.3.

When the aspect ratio of the natural graphite is out of these ranges and for example, lower than about 0.5, battery capacity characteristics may be poor or unsuitable, and for example, when an aspect ratio of the natural graphite is higher than about 2, capacity reduction and poor or unsuitable cell performance may occur due to lack of (e.g., reduced or unsuitable) contact between the natural graphite and the solid electrolyte.

In some embodiments, the anode may further include a binder having a glass transition temperature ($T_g$) of higher than about −55° C.

For example, the glass transition temperature ($T_g$) of the binder may be in a range of higher than about −55° C. to lower than about −20° C. When the glass transition temperature of the binder is within this range, an appropriate or suitable polar characteristic (polarity) of the binder may reduce side reactions with the solid electrolyte.

Non-limiting examples of the binder include styrene butadiene rubber (SBR).

In some embodiments, the anode may further include a solid electrolyte.

Here, an average particle diameter (D50) of the solid electrolyte may be in a range of about 0.1 μm to about 3 μm. When the average particle diameter (D50) of the solid electrolyte is within this range, an effect of allowing lithium ion transfer in the anode plate may be exhibited.

Here, the solid electrolyte may be a sulfide-based solid electrolyte. In the all-solid secondary battery including the sulfide-based solid electrolyte as described, when lithium metal is utilized as an anode active material, lithium may be liquified as a high-temperature pressure is applied to a stack of anode/electrolyte/cathode due to the soft nature of the lithium metal, and thus an electrode plate may be modified. Also, some lithium may penetrate into the sulfide-based solid electrolyte, causing short-circuit occurrence or internal cracks and short-circuit at charging of the battery, and thus lifespan of the battery may be shortened.

On the other hand, when a Li-free polymer or a carbonaceous material is introduced as an anode active material, short-circuit does not occur during a battery preparation process, but long lifespan of an all-solid secondary battery may not be expected due to limit on a Li amount in the battery.

However, when the natural graphite having the average particle diameter within the ranges and including an amorphous carbon coating layer is utilized as an anode active material in a battery, the battery may have excellent battery lifespan characteristics due to stable lithium ion migration in the amorphous carbon coating layer even when a sulfide-based solid electrolyte is included in the battery.

Here, the sulfide-based solid electrolyte may be at least one selected from $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each independently a positive integer, and Z is one of Ge, Zn, or Ga), $Li_2S$—$GeS_2$, $Li_2S$—$SiS_2$—$Li_3PO_4$, $Li_2S$—$SiS_2$-$Li_pMO_q$ (where p and q are each independently a positive integer, M is one of P, Si, Ge, B, Al, Ga, or In), $Li_{7-x}PS_{6-x}Cl_x$ (where 0≤x≤2), $Li_{7-x}PS_{6-x}Br_x$ (where 0≤x≤2), and $Li_{7-x}PS_{6-x}I_x$ (where 0≤x≤2).

For example, the sulfide-based solid electrolyte may be an argyrodite-type or kind solid electrolyte including at least one selected from $Li_6PS_5Cl$, $Li_6PS_5Br$, and $Li_6PS_5I$.

A density of the argyrodite solid electrolyte may be in a range of about 1.5 g/cc to about 2.0 g/cc.

In some embodiments, the anode may include the natural graphite in an amount of about 50 weight % or higher based on the total weight of the anode.

In some embodiments, the anode may not include (e.g., may exclude) a (any) conducting material other than the natural graphite.

In some embodiments, the solid electrolyte layer may include a sulfide-based solid electrolyte. Here, description of the sulfide-based solid electrolyte is substantially the same as described.

In some embodiments, the anode may include a solid electrolyte, and the solid electrolyte in the anode and the solid electrolyte in the solid electrolyte layer may be identical to or different from each other.

Hereinafter, an example all-solid secondary battery will be described in more detail with reference to the accompanying drawings.

All-Solid Secondary Battery

Referring to FIG. 1, an all-solid secondary battery 1 includes a cathode 10; an anode 20; and a solid electrolyte layer 30 between the cathode 10 and the anode 20, wherein the cathode 10 includes a cathode current collector 11 and a cathode active material layer 12 on the cathode current collector 11, and the anode 20 includes an anode current collector 21 and an anode active material layer 22 on the anode current collector 21 and containing the natural graphite.

Cathode: Cathode Current Collector

The cathode current collector 11 may be, for example, a plate or a foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. In some embodiments, the cathode current collector 11 may be omitted (e.g., may not be included).

Cathode: Cathode Active Material

The cathode active material layer 12 may include, for example, a cathode active material and a solid electrolyte. The solid electrolyte in the cathode 10 may be similar to or different from a solid electrolyte in the solid electrolyte layer 30. A detailed of the solid electrolyte is provided in relation to the solid electrolyte layer 30.

The cathode active material is a cathode active material capable of reversibly absorbing and desorbing lithium ions. The cathode active material may be, for example, a lithium transition metal oxide (such as a lithium cobalt oxide (LCO), a lithium nickel oxide, a lithium nickel cobalt oxide, a lithium nickel cobalt aluminum oxide (NCA), a lithium nickel cobalt manganese oxide (NCM), a lithium manganate, and/or a lithium iron phosphate); a nickel sulfide; a copper sulfide; a lithium sulfide; an iron oxide; or a vanadium oxide, but embodiments are not limited thereto, and any material available as a cathode active material in the art may be utilized. The cathode active material be utilized alone or in a mixture of at least two selected from these examples.

The cathode active material may be or include, for example, a compound represented by one of the following formulae:

$Li_aA_{1-b}B'_bD_2$ (where 0.90≤a≤1 and 0≤b≤0.5); $Li_aE_{1-b}B'_bO_{2-c}D_c$ (where 0.90≤a≤1, 0≤b≤0.5, and 0≤c≤0.05); $LiE_{2-b}B'_bO_{4-c}D_c$ (where 0≤b≤0.5 and 0≤c≤0.05); $Li_aN_{1-b-c}Co_bB'_cD_\alpha$ (where 0.90≤a≤1, 0≤b≤0.5, 0≤c≤0.05, and 0≤α≤2); $Li_aNi_{1-b-c}Co_bB'_cO_{2-\alpha}F'_\alpha$ (where 0.90≤a≤1, 0≤b≤0.5, 0≤c≤0.05, and 0≤α≤2); $Li_aNi_{1-b-c}CO_bB'_cO_{2-\alpha}F'_2$ (where 0.90≤a≤1, 0≤b≤0.5, 0≤c≤0.05, and 0≤α≤2); $Li_aNi_{1-b-c}Mn_bB'_cD_\alpha$ (where 0.90≤a≤1, 0≤b≤0.5, 0≤c≤0.05, and 0≤α≤2); $Li_aNi_{1-b-c}Mn_bB'_cO_{2-\alpha}F'_\alpha$ (where 0.90≤a≤1, 0≤b≤0.5, 0≤c≤0.05, and 0≤α≤2); $Li_aNi_{1-b-c}Mn_bB'_cO_{2-\alpha}F'_2$ (where 0.90≤a≤1, 0≤b≤0.5, 0≤c≤0.05, and 0≤α≤2); $Li_aNi_bE_cG'_dO_2$ (where 0.90≤a≤1, 0≤b≤0.9, 0≤c≤0.5, and 0.001≤d≤0.1); $Li_aNi_bCo_cMn_dG'_eO_2$ (where 0.90≤a≤1, 0≤b≤0.9, 0≤c≤0.5, 0≤d≤0.5, and 0.001≤e≤0.1); $Li_aNiG'_bO_2$ (where 0.90≤a≤1 and 0.001≤b≤0.1); $Li_aCoG'_bO_2$ (where 0.90≤a≤1 and 0.001≤b≤0.1); $Li_aMnG'_bO_2$ (where 0.90≤a≤1 and 0.001≤b≤0.1); $Li_aMn_2G'_bO_4$ (where 0.90≤a≤1 and 0.001≤b≤0.1); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where 0≤f≤2); $Li_{(3-f)}Fe_2(PO_4)_3$ (where 0≤f≤2); and $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G' may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. In some embodiments, the compound(s) may have a surface coating layer (hereinafter, also referred to as "coating layer"). In some embodiments, a mixture of a compound without a coating layer and a compound having a coating layer, the compounds being selected from the compounds listed above, may be utilized. In some embodiments, the coating layer may include at least one compound of a coating element selected from the group consisting of an oxide compound, a hydroxide compound, an oxyhydroxide compound, an oxycarbonate compound, and a hydroxycarbonate compound of the coating element. In some embodiments, the compound for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed utilizing any method that does not adversely affect the physical properties of the cathode active material. For example, the coating layer may be formed utilizing a spray coating method or a dipping method. The coating methods may be well understood by one of ordinary skill in the art, and detailed descriptions thereof will not be provided.

The cathode active material may include, for example, a lithium salt of a transition metal oxide that has a layered rock-salt structure (e.g., crystal lattice or crystal structure), among the examples of the lithium transition metal oxide. The term "layered rock-salt structure" refers to a structure in which an oxygen atom layer and a metal atom layer are alternately and regularly arranged in a <111> direction in a cubic rock-salt structure, where each of the atom layers forms (e.g., is present as) a two-dimensional flat plane. The term "cubic rock-salt structure" refers to a sodium chloride (NaCl) structure, which is a crystalline structure in which face-centered cubic (fcc) lattices respectively formed of anions and cations are shifted by a half unit of each unit lattice. Non-limiting examples of the lithium transition metal oxide having the layered rock-salt structure may include a ternary lithium transition metal oxide such as $LiNi_xCo_yAl_zO_2$ (NCA) and/or $LiNi_xCo_yMn_zO_2$ (NCM) (where $0<x<1$, $0<y<1$, $0<z<1$, and $x+y+z=1$). When the cathode active material includes a ternary transition metal oxide having the layered rock-salt structure, the energy density and/or thermal stability of the all-solid secondary battery 1 may be improved.

The cathode active material may be covered by a coating layer as described above. The coating layer are any material that may be utilized as a coating layer of a cathode active material of an all-solid secondary battery in the art. The coating layer may be, for example, $Li_2O$—$ZrO_2$ (LZO).

When the cathode active material includes a ternary lithium transition metal oxide including nickel (Ni) (such as NCA or NCM), a capacity density of the all-solid secondary battery 1 may be increased, and metal elution from the cathode active material in a charged state may be reduced. As a result, the all-solid secondary battery 1 according to an embodiment may have improved cycle characteristics.

A particle shape of the cathode active material may be a true spherical shape, an elliptical shape, and/or a spherical shape. A particle diameter of the cathode active material is not particularly limited but may be in a range applicable to a cathode active material of an all-solid secondary battery in the art. An amount of the cathode active material of the cathode 10 is not particularly limited and may be in a range applicable to a cathode layer of an all-solid secondary battery in the art.

Cathode: Solid Electrolyte

The cathode active material layer 12 may include, for example, a solid electrolyte. The solid electrolyte in the cathode 10 may be identical to or different from a solid electrolyte in the solid electrolyte layer 30. A detailed description of the solid electrolyte is provided in relation to the solid electrolyte layer 30.

An average particle diameter (D50) of the solid electrolyte in the cathode active material layer 12 may be smaller compared to that of the solid electrolyte in the solid electrolyte layer 30. For example, an average particle diameter (D50) of the solid electrolyte in the cathode active material layer 12 may be about 90% or less, about 80% or less, about 70% or less, about 60% or less, about 50% or less, about 40% or less, about 30% or less, or about 20% or less of an average particle diameter (D50) of the solid electrolyte in the solid electrolyte layer 30.

Cathode: Binder

The cathode active material layer 12 may include a binder. The binder may be or include styrene butadiene rubber (SBR), polytetrafluoroethylene, polyvinylidene fluoride, and/or polyethylene.

Cathode: Conducting Material

The cathode active material layer 12 may include a conducting material. The conducting material may be or include, for example, graphite, carbon black, acetylene black, ketjen black, carbon fiber, and/or metal powder.

Cathode: Additive

The cathode 10 may further include, for example, additives such as a filler, a coating agent, a dispersant, and/or an ion conducting agent in addition to the cathode active material, solid electrolyte, binder, and conducting material.

The filler, coating agent, dispersant, and ion conducting agent that may be included in the cathode 10 may each independently be materials that are generally utilized in an electrode of an all-solid secondary battery in the art.

Solid Electrolyte Layer

Solid Electrolyte Layer: Sulfide-Based Solid Electrolyte

Referring to FIG. 1, the solid electrolyte layer 30 includes a sulfide-based solid electrolyte between the cathode 10 and the anode 20.

The sulfide-based solid electrolyte may be at least one selected from $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive integer, and Z is one of Ge, Zn, or Ga), $Li_2S$—$GeS_2$, $Li_2S$—$SiS_2$—$Li_3PO_4$, $Li_2S$—$SiS_2$-$Li_pMO_q$ (where p and q are each a positive integer, and M is one of P, Si, Ge, B, Al, Ga, or In), $Li_{7-x}PS_{6-x}Cl_x$ (where $0≤x≤2$), $Li_{7-x}PS_{6-x}Br_x$ (where $0≤x≤2$), and $Li_{7-x}PS_{6-x}I_x$ (where $0≤x≤2$). The sulfide-based solid electrolyte may be prepared by melting and quenching starting materials (e.g., $Li_2S$ and/or $P_2S_5$), or mechanical milling the starting materials. Subsequently, the resultant may be heat-treated. The sulfide-based solid electrolyte may be amorphous or crystalline, or may be a mixed form thereof. In some embodiments, the sulfide-based solid electrolyte may be a material selected from these examples of the sulfide-based solid electrolyte including at least sulfur (S), phosphorus (P), and lithium (Li), as component elements. For example, the sulfide-based solid electrolyte may be a material including $Li_2S$—$P_2S_5$. Here, when the material including $Li_2S$—$P_2S_5$ is utilized as a sulfide-based solid electrolyte material, a mixing molar ratio of $Li_2S$ and $P_2S_5$ ($Li_2S:P_2S_5$) may be, for example, selected in a range of about 50:50 to about 90:10.

For example, the sulfide-based solid electrolyte may be an argyrodite-compound including at least one selected from $Li_{7-x}PS_{6-x}Cl_x$ (where $0≤x≤2$), $Li_{7-x}PS_{6-x}Br_x$ (where $0≤x≤2$), and $Li_{7-x}PS_{6-x}I_x$ (where $0≤x≤2$). For example, the sulfide-based solid electrolyte may be an argyrodite solid electrolyte including at least one selected from $Li_6PS_5Cl$, $Li_6PS_5Br$, and $Li_6PS_5I$.

A density of the argyrodite solid electrolyte may be in a range of about 1.5 g/cc to about 2.0 g/cc. When a density of the argyrodite solid electrolyte is about 1.5 g/cc or higher, internal resistance of an all-solid secondary battery may decrease, and penetration of a solid electrolyte layer by migration of Li may be effectively suppressed.

An elastic modulus of the sulfide-based solid electrolyte may be, for example, in a range of about 15 GPa to about 35 GPa.

Solid Electrolyte Layer: Binder

The solid electrolyte layer 30 may include, for example, a binder. The binder in the solid electrolyte layer 30 may be, for example, styrene butadiene rubber (SBR), polytetrafluoroethylene, polyvinylidene fluoride, and/or polyethylene, but embodiments are not limited thereto, and any material available as a binder in the art may be utilized. The binder of the solid electrolyte layer 30 may be identical to or different from a binder in the cathode active material layer 12 and a binder in the anode active material layer 22.

Anode

Anode Layer: Anode Active Material

The anode active material layer 22 is substantially the same as described. For example, the anode active material layer 22 may include natural graphite, and the natural graphite may have an average particle diameter (D50) in a range of greater than about 10 μm to about 20 μm or less, and may include an amorphous carbon coating layer.

The amorphous carbon of the amorphous carbon coating layer may be or include, for example, carbon black (CB), acetylene black (AB), furnace black (FB), ketjen black (KB), and/or graphene, but embodiments are not limited thereto, and any material available as amorphous carbon in the art may be utilized. The amorphous carbon is carbon having substantially no crystallinity or a very low crystallinity, which is different from crystalline carbon or graphene-based carbon.

In some embodiments, the anode may further include a metal or metalloid anode active material.

Non-limiting examples of the metal or metalloid anode active material include at least one selected from the group consisting of gold (Au), platinum (Pt), palladium (Pd), silicon (Si), silver (Ag), aluminum (Al), bismuth (Bi), tin (Sn), and zinc (Zn), but embodiments are not limited thereto, and any material that forms an alloy or a compound with lithium in the art may be utilized as the metal or metalloid anode active material. For example, nickel (Ni) does not form an alloy with lithium and thus is not a metal anode active material.

Anode Layer: Binder

The binder in the anode active material layer 22 may be any material having a glass transition temperature in the range.

For example, the binder may be or include styrene-butadiene rubber (SBR), polytetrafluoroethylene (PTFE), polyvinylidene fluoride (PVDF), polyethylene, a vinylidene fluoride/hexafluoropropylene copolymer, polyacrylonitrile, and/or polymethylmethacrylate, but embodiments are not limited thereto, and any material available as a binder in the art may be utilized. The binder may be formed of one of these example binder alone, or a plurality of different binders.

When the anode active material layer 22 includes the binder, the anode active material layer 22 is stabilized on the anode current collector 21. Also, cracks of the anode active material layer 22 may be suppressed or reduced in spite of volume changes and/or relative location changes of the anode active material layer 22 during charging/discharging. For example, when the anode active material layer 22 does not include a binder, the anode active material layer 22 may be easily separated from the anode current collector 21. At a part of the anode current collector 21 is detached from the anode active material layer 22, the exposed part of the anode current collector 21 may contact the solid electrolyte layer 30, and thus a risk of short-circuit may increase. The anode active material layer 22 may be prepared by, for example, coating and drying a slurry, in which materials forming the anode active material layer 22 are dispersed on the anode current collector 21. When the binder is included in the anode active material layer 22, the anode active material may be stably dispersed in the slurry. For example, when the slurry is coated on the anode current collector 21 utilizing a screen printing method, clogging of the screen (e.g., clogging by an aggregate of the anode active material) may be suppressed or reduced.

Anode Layer: Additive

The anode active material layer 22 may further include additives (such as a filler, a coating agent, a dispersant, and/or an ion conducting agent) utilized in an all-solid secondary battery of the related art.

Anode Layer: Anode Active Material Layer 22

A thickness of the anode active material layer 22 may be, for example, about 50% or less, about 40% or less, about 30% or less, about 20% or less, about 10% or less, or about 5% or less of a thickness of the cathode active material layer 12. A thickness of the anode active material layer 22 may be, for example, in a range of about 1 μm to about 20 μm, about 2 μm to about 10 μm, or about 3 μm to about 7 μm. When the anode active material layer 22 is too thick, an energy density of the all-solid secondary battery 1 may be deteriorated, and internal resistance of the all-solid secondary battery 1 may increase by the anode active material layer 22, which may not improve cycle characteristics of the all-solid secondary battery 1.

When the thickness of the anode active material layer 22 decreases, for example, a charge capacity of the anode active material layer 22 may decrease. A charge capacity of the anode active material layer 22 may be, for example, about 50% or lower, about 40% or lower, about 30% or lower, about 20% or lower, about 10% or lower, about 5% or lower, or about 2% or lower compared to a charge capacity of the cathode active material layer 12. A charge capacity of the anode active material layer 22 may be, for example, in a range of about 0.1% to about 50%, about 0.1% to about 40%, about 0.1% to about 30%, about 0.1% to about 20%, about 0.1% to about 10%, about 0.1% to about 5%, or about 0.1% to about 2% compared to a charge capacity of the cathode active material layer 12. When the charge capacity of the anode active material layer 22 is too low, a thickness of the anode active material layer 22 is too thin, and lithium dendrites formed between the anode active material layer 22 and the anode current collector 21 during repeated charging/discharging processes may destroy the anode active material layer 22, and the cycle characteristics of the all-solid secondary battery 1 may not be improved (e.g., may be deteriorated). When the charge capacity of the anode active material layer 22 is too high, an energy density of the all-solid secondary battery 1 may be deteriorated, and internal resistance of the all-solid secondary battery 1 by the anode active material layer 22 may increase, and the cycle characteristics of the all-solid secondary battery 1 may not be improved (e.g., may be deteriorated).

The charge capacity of the cathode active material layer 12 may be obtained by multiplying a weight of the cathode active material in the cathode active material layer 12 by a charge capacity density (mAh/g) of the cathode active material. When one or more suitable types (kinds) of materials are utilized as the cathode active material, a value of a charge capacity density multiplied by a weight of each of the cathode active materials is calculated, and the total (sum) of these values is a charge capacity of the cathode active material layer 12. A charge capacity of the anode active material layer 22 may be calculated in substantially the same manner. For example, a charge capacity of the anode active material layer 22 may be obtained by multiplying a weight of the anode active material in the anode active material layer 22 by a charge capacity density (mAh/g) of the anode active material. When one or more suitable types (kinds) of materials are utilized as the anode active material, a value of a charge capacity density multiplied by a weight of each of the anode active materials may be calculated, and the total of these values is a charge capacity of the anode active material layer 22. Here, the charge capacity densities of the cathode active material and the anode active material may be estimated by utilizing an all-solid half-cell, in which lithium metal is utilized as a counter electrode. The charge capacity densities of the cathode active material layer 12 and the anode active material layer 22 may be directly measured by the charge capacity measurement utilizing the all-solid half-cell. When the measured charge capacity is divided by a weight of each of the active materials, a charge capacity density may be obtained. In some embodiments, the charge capacities of the cathode active material layer 12 and the anode active material layer 22 may be initial charge capacities measured in the 1st charging cycle.

Anode Layer: Second Anode Active Material

The all-solid secondary battery 1 may further include, for example, a second anode active material layer between the anode current collector 21 and the anode active material layer 22 by charging. The second anode active material layer may be a metal layer including lithium or a lithium alloy. The metal layer may include lithium or a lithium alloy. Therefore, because the second anode active material layer is a metal layer including lithium, the second anode active material layer may serve as a lithium reservoir. The lithium alloy may be, for example, a Li—Al alloy, a Li—Sn alloy, a Li—In alloy, a Li—Ag alloy, a Li—Au alloy, a Li—Zn alloy, a Li—Ge alloy, and/or a Li—Si alloy, but embodiments are not limited thereto, and any material available as a lithium alloy in the art may be utilized. The second anode active material layer may be formed of one of these alloys or lithium, or may be formed of one or more suitable alloys.

A thickness of the second anode active material layer may be, for example, in a range of about 1 μm to about 1000 μm, about 1 μm to about 500 μm, about 1 μm to about 200 μm, about 1 μm to about 150 μm, about 1 μm to about 100 μm, or about 1 μm to about 50 μm, but embodiments are not limited thereto. When the second anode active material layer is too thin, the second anode active material layer may not serve as a lithium reservoir. When the second anode active material layer is too thick, a weight and a volume of the all-solid secondary battery 1 may increase, and cycle characteristics may be deteriorated. The second anode active material layer may be, for example, a metal foil having a thickness in these ranges.

In the all-solid secondary battery 1, the second anode active material layer may be, for example, provided between the anode current collector 21 and the anode active material layer 22 before assembling the all-solid secondary battery 1, or may be, for example, deposited between the anode current collector 21 and the anode active material layer 22 by charging after assembling the all-solid secondary battery 1. When the second anode active material layer is provided between the anode current collector 21 and the anode active material layer 22 before assembling the all-solid secondary battery 1, the second anode active material layer is a metal layer including lithium and thus may serve as a lithium reservoir. For example, a lithium foil may be provided between the anode current collector 21 and the anode active material layer 22 before assembling the all-solid secondary battery 1. In this regard, the cycle characteristics of the all-solid secondary battery 1 including the second anode active material may be further improved. When the second anode active material layer is not deposited by charging after assembling the all-solid secondary battery 1, an energy density of the all-solid secondary battery 1 increases due to not including the second anode active material layer in the assembly of the all-solid secondary battery 1. For example, the all-solid secondary battery 1 may be charged over a charge capacity of the anode active material layer 22. For example, the anode active material layer 22 may be overcharged. In the beginning of the charging, lithium may be absorbed in the anode active material layer 22. The anode active material in the anode active material layer 22 may form an alloy or a compound with lithium ions migrated from the cathode 10. When the anode active material layer 22 is charged over the charge capacity, for example, lithium is deposited on a back surface of the anode active material layer 22 (which is between the anode current collector 21 and the anode active material layer 22), and a metal layer corresponding to the second anode active material layer may be formed by the deposited lithium. The second anode active material layer may be a metal layer mainly formed of lithium (e.g., metal lithium). This result may be obtained because, for example, the anode active material in the anode active material layer 22 is formed of a material capable of forming an alloy or a compound with lithium. In discharging of the all-solid secondary battery 1, lithium of the anode active material layer 22 and the second anode active material layer, that is a metal layer, may be ionized and may migrate in a direction to the cathode 10. Thus, lithium may be utilized as an anode active material in the all-solid secondary battery 1. Also, because the anode active material layer 22 covers the second anode active material layer, the anode active material layer 22 may serve as a protective layer of the second anode active material layer and may suppress or reduce deposition and/or growth of lithium dendrites at the same time. Thus, short-circuit occurrence and/or capacity deterioration of the all-solid secondary battery 1 may be suppressed, and, as a result, cycle characteristics of the all-solid secondary battery 1 may be improved. Also, when the second anode active material layer is formed by charging after assembling the all-solid secondary battery 1, a region between the anode current collector 21 and the anode active material layer 22 may be, for example, a substantially Li-free region, in which lithium (Li) in the initial state or a state after discharging of the all-solid secondary battery 1 is not included.

Anode Layer: Anode Current Collector

The anode current collector 21 may be formed of, for example, a material that does not react with lithium, e.g., a material that does not form a Li alloy or a Li compound. Non-limiting examples of the material for forming the anode current collector 21 may include copper (Cu), stainless steel, titanium (Ti), iron (Fe), cobalt (Co), and/or nickel (Ni), but embodiments are not limited thereto, and any material available as an electrode current collector in the art may be utilized. The anode current collector 21 may be formed of one of the examples of the metal or an alloy or a coating material of at least two metals. The anode current collector 21 may be, for example, in the form of a plate or a foil.

The all-solid secondary battery 1 may further include a thin film including an element capable of forming an alloy with lithium on the anode current collector 21. The thin film may be provided between the anode current collector 21 and the anode active material layer 22. The thin film may, for example, include an element capable of forming an alloy with lithium. Non-limiting examples of the element capable of forming an alloy with lithium include gold, silver, zinc, tin, indium, silicon, aluminum, and/or bismuth, but embodiments are not limited thereto, and any element capable of forming an alloy with lithium in the art may be utilized. The thin film may be formed of any of these metals or alloys of one or more suitable metals. When the thin film is provided on the anode current collector 21, for example, a deposition form of a second anode active material layer deposited between the thin film and the anode active material layer 22 may be further flattened or planarized, and thus cycle characteristics of the all-solid secondary battery 1 may further be improved.

A thickness of the thin film may be, for example, in a range of about 1 nm to about 800 nm, about 10 nm to about 700 nm, about 50 nm to about 600 nm, or about 100 nm to about 500 nm. When the thickness of the thin film is less than 1 nm, the functions of the thin film may not be exhibited. When the thin film is too thick, the thin film itself may absorb lithium, and the amount of lithium deposited in the anode may decrease, resulting in deterioration of an energy density of the all-solid secondary battery 1, and thus the cycle characteristics of the all-solid secondary battery 1 may be deteriorated. The thin film may be provided on the anode current collector 21 by, for example, vacuum vapor deposition, sputtering, or plating, but embodiments are not limited thereto, and any method capable of forming a thin film in the art may be utilized.

Next, a method of preparing the all-solid secondary battery according to an embodiment will be described.

In some embodiments, the method may include providing an anode; providing a cathode; providing a solid electrolyte between the anode and the cathode to prepare a stack; and pressing the stack.

The pressing of the stack may be performed at a temperature in a range of about 20° C. to about 90° C. and a pressure of about 550 MPa or lower, for example, in a range of about 400 MPa to about 500 MPa, thereby completing preparation of the all-solid secondary battery. A time of the pressing of the stack may vary depending on the temperature and pressure of the pressing and for example, may be less than about 30 minutes. Also, the pressing of the stack may be performed by, for example, isostatic pressing, roll pressing, and/or plate pressing.

The all-solid secondary battery according to an embodiment may be applied in a medium-to-large battery and/or an energy storage system (ESS).

One or more embodiments will now be described in more detail with reference to the following examples. However, these examples are not intended to limit the scope of the one or more embodiments.

Example 1: Preparation of Li—In Torque Half-Cell Utilizing Natural Graphite 60 mg of natural graphite having a pellet density of about 1.93 g/cm$^3$ and an average particle diameter (D50) of about 17 μm, 5 mg of carbon black, and 30 mg of a sulfide-based solid electrolyte were mixed, and natural graphite coated with carbon black was obtained as an anode mixture.

An electrolyte layer was prepared in a torque cell utilizing 100 mg of the sulfide-based solid electrolyte, and 10 mg of the anode mixture was evenly spread on the electrolyte layer.

A lithium indium (Li—In) alloy having a thickness of about 70 μm was placed as a counter electrode on the opposite side, and a pressure of 40 kN was applied thereto to prepare a Li half-cell.

Comparative Example 1

A half-cell was prepared in substantially the same manner as in Example 1, except that mesocarbon microbeads (MCMBs) were utilized instead of the natural graphite.

Comparative Example 2

A half-cell was prepared in substantially the same manner as in Comparative Example 1, except that carbon black was not included.

Comparative Example 3

A half-cell was prepared in substantially the same manner as in Example 1, except that carbon black was not included.

Evaluation Example 1: Torque Cell Capacity Analysis

The half-cells prepared in Example 1 and Comparative Examples 1 to 3 were charged under conditions of a temperature of about 25° C., a constant current of 0.05 C, and a cut-off voltage of −0.61 V, and the discharged under the conditions of temperature of 25° C., a constant current of 0.05 C, and a cut-off voltage of 1.41 V. This charging and discharging cycle was repeated 2 times.

The torque cell capacities after the 2$^{nd}$ cycle were measured utilizing a charger/discharger, and the results are shown in Table 1.

Figure 2A:
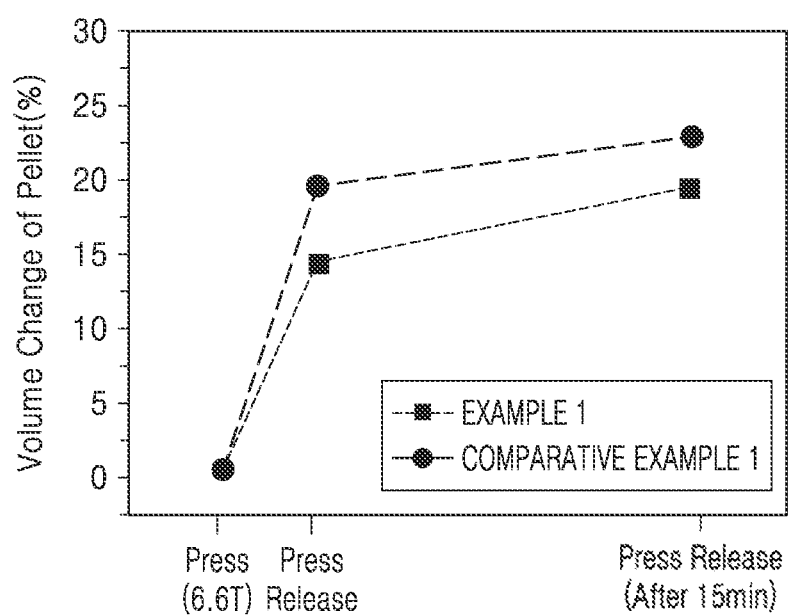
FIG. 2A is a graph showing the results of measuring a volume change of a pellet of natural graphite utilized in Example 1 and mesocarbon microbeads (MCMBs) utilized in Comparative Example 1.
Figure 2B:
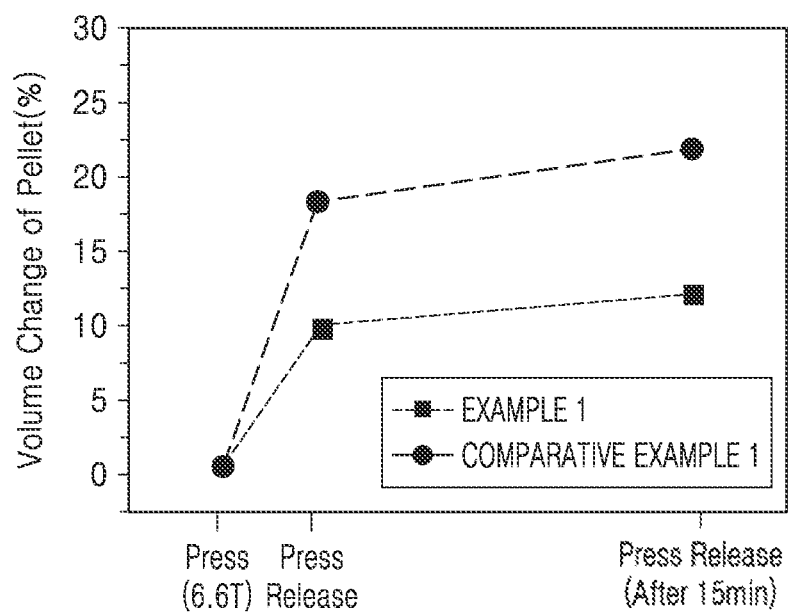
FIG. 2B is a graph showing the results of measuring a volume change of a pellet after mixing a sulfide-based solid electrolyte with each of the natural graphite utilized in Example 1 and the MCMBs utilized in Comparative Example 1.

Separately, the volume changes due to a spring back phenomenon, measured about 15 minutes after pressing the natural graphite utilized in Example 1 and MCMBs utilized in Comparative Example 1 at a pressure of about 6.6 ton (T), are shown in FIG. 2A, and the results of volume changes measured in the same manner after mixing a sulfide-based solid electrolyte with the natural graphite and the MCMBs are shown in FIG. 2B.

TABLE 1

|  | Torque cell capacity (mAh/g, Li—In half-cell) |
| --- | --- |
| Example 1 | 379 |
| Comparative Example 1 | 355 |
| Comparative Example 2 | 296 |
| Comparative Example 3 | 141 |

Referring to Table 1, the half-cell prepared in Example 1 exhibited a torque cell capacity higher than those of the half-cells prepared in Comparative Examples 1 to 3.

Referring to FIGS. 2A and 2B, when the natural graphite utilized in Example 1 was included, a volume change rate of the pellet was in a range of about 15% to about 20% despite not including a solid electrolyte, and when a solid electrolyte was included, a volume change rate of the half-cell caused by a spring back phenomenon was reduced to about 10%. On the other hand, when artificial graphite (MCMBs) was included as in Comparative Example 1, a volume change rate of the pellet was about 20% or higher regardless of including a solid electrolyte.

When MCMBs having such a high volume change rate is utilized as an all-solid battery material, problems such as a high interfacial resistance may occur, which may adversely affect the capacity characteristics of a battery.

Example 2: Preparation of Li Half-Cell Utilizing Natural Graphite 60 mg of natural graphite having a pellet density of about 1.93 g/cm$^3$ and an average particle diameter (D50) of about 17 μm, 5 mg of carbon nanofibers (CNFs), and 30 mg of a sulfide-based solid electrolyte were mixed to obtain natural graphite coated with carbon nanofibers to prepare an anode mixture.

An electrolyte layer was prepared in a torque cell utilizing 100 mg of a sulfide-based solid electrolyte, and 10 mg of the anode mixture was evenly spread on the electrolyte layer.

A lithium indium (Li—In) alloy having a thickness of about 70 μm was placed as a counter electrode on the opposite side, and a pressure of 40 kN was applied thereto to prepare a Li half-cell.

Example 3

A half-cell was prepared in substantially the same manner as in Example 2, except that natural graphite having a pellet density of about 1.83 g/cm$^3$ and an average particle diameter (D50) of about 16.2 μm.

Example 4

A half-cell was prepared in substantially the same manner as in Example 2, except that natural graphite having a pellet density of about 1.87 g/cm$^3$ and an average particle diameter (D50) of about 17 μm.

Comparative Example 7

A half-cell was prepared in substantially the same manner as in Example 2, except that natural graphite having a pellet density of about 1.9 g/cm$^3$ and an average particle diameter (D50) of about 7.7 μm.

Evaluation Example 2: Torque Cell Capacity Analysis

The half-cells prepared in Examples 2 to 5 were charged under conditions of a temperature of about 25° C., a constant current of about 0.05 C, and a cut-off voltage of about 10 mV to measure the constant-current (CC) charge capacities of the half-cells, and then discharged under conditions of a temperature of about 25° C., a constant current of about 0.05 C, and a 0.1 C cut-off voltage to measure discharge capacities of the half-cells.

Efficiencies were measured utilizing the charge capacities and the discharge capacities obtained from the evaluation.

The results of the measurement are shown in Table 2.

TABLE 2

|  | Charge capacity (mAh/g) | Discharge capacity (mAh/g) | Efficiency (%) |
|---|---|---|---|
| Example 2 | 356 | 339 | 95.1 |
| Example 3 | 232 | 217 | 93.6 |
| Example 4 | 254 | 228 | 89.7 |
| Comparative Example 7 | 224 | 210 | 93.6 |

Referring to Table 2, the capacity characteristics and efficiency characteristics of a half-cell may vary depending on the average particle diameter (D50) and/or the pellet density in spite of utilizing natural graphite including the same amorphous carbon coating layer.

Example 6: Preparation of Full-Cell Utilizing Natural Graphite/Anode Binder

Preparation of Anode

Natural graphite having a pellet density of about 1.93 g/cm$^3$ and an average particle diameter (D50) of about 17 μm coated with carbon black having a concentration of about 3% was obtained utilizing a chemical vapor deposition (CVD) method.

The coated natural graphite, a sulfide-based solid electrolyte, and a binder, styrene butadiene rubber (SBR), having a glass transition temperature ($T_g$) of about −35° C. were mixed at a weight ratio of 80:20:2 to prepare an anode slurry.

The anode slurry was coated at a thickness of about 120 μm on a copper current collector (e.g., an anode current collector), having a thickness of about 10 μm to prepare an anode.

Preparation of Cathode

Lithium nickel cobalt aluminum oxide (NCA) as a cathode active material, agyrodite as a solid electrolyte, CNFs and carbon black (CB) as a conducting material, and polyvinylidene fluoride (PVDF) as a binder were mixed at a weight ratio of about 89:8.8:1.2:1 to prepare a cathode slurry.

The cathode slurry was coated at a thickness of about 120 μm on an aluminum (Al) current collector, which is a cathode current collector, having a thickness of about 30 μm to prepare a cathode.

Preparation of Solid Electrolyte Sheet

Agyrodite as a solid electrolyte and an acrylate-based solution at an amount of about 4.2 wt % as a binder were mixed to prepare a solid electrolyte slurry.

The solid electrolyte slurry was coated at a thickness in a range of about 70 μm to about 80 μm on a non-woven fabric having a thickness of about 10 μm to prepare an electrolyte sheet.

Preparation of Full-Cell

The anode, the solid electrolyte layer, (an agyrodite sheet having a thickness in a range of about 60 μm to about 70 μm), and the cathode were sequentially stacked and vacuum-sealed in a pouch, and a warm isostatic pressure (WIP) in a range of about 400 MPa to about 550 MPa was applied to the stack to prepare a full-cell having a structure of anode/solid electrolyte/cathode.

Comparative Example 4

A full-cell was prepared in substantially the same manner as in Example 6, except that a binder having a glass transition temperature ($T_g$) of about −55° C. was utilized as an anode binder.

Comparative Example 5

A full-cell was prepared in substantially the same manner as in Example 6, except that a binder having a glass transition temperature ($T_g$) of about −60° C. was utilized as an anode binder.

Evaluation Example 3: Battery Capacity Analysis

The full-cells prepared in Example 6 and Comparative Examples 4 and 5 were charged under conditions of a temperature of about 25° C., a constant current of about 0.05

C., and a cut-off voltage of about 10 mV, and then discharged under conditions of a temperature of about 25° C., a constant current of about 0.05 C, and a 0.1 C cut-off voltage.

Figure 3:
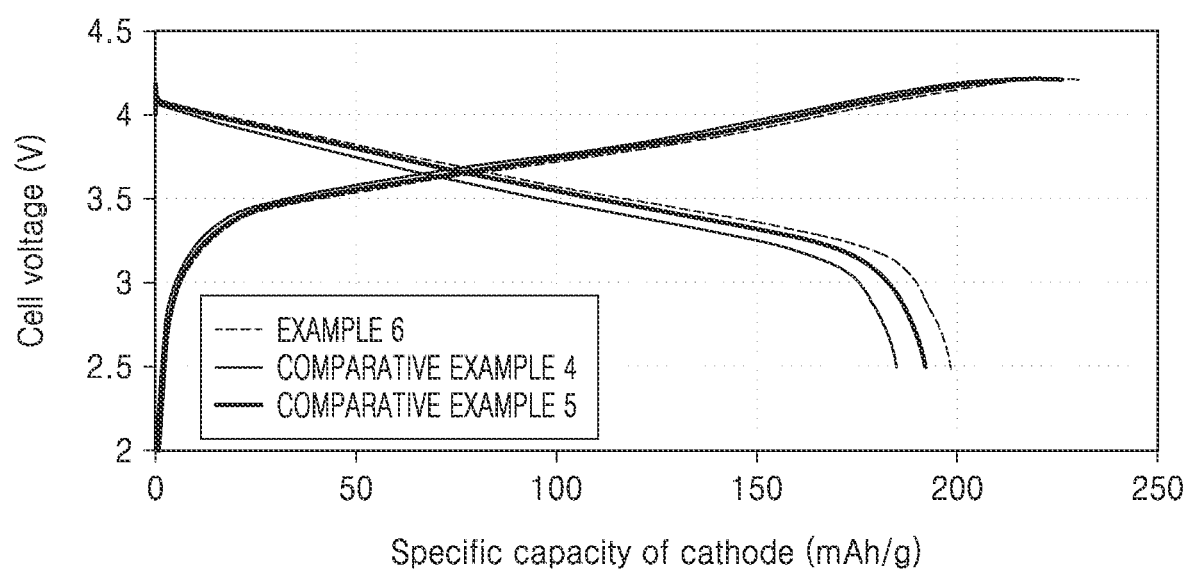
FIG. 3 is a graph showing the results of the charging/discharging characteristics (voltage-capacity curves) with respect to batteries of Example 6 and Comparative Examples 4 and 5.

Capacities of the full-cells were measured utilizing a charger/discharger, and the results of the measurement are shown in Table 3. Also, a charge/discharge graph of the full-cells is shown in FIG. 3.

TABLE 3

|  | Battery capacity (mAh/g) |
| --- | --- |
| Example 6 | 197.8 |
| Comparative Example 4 | 184 |
| Comparative Example 5 | 192 |

Comparative Example 6

A full-cell was prepared in substantially the same manner as in Example 6, except that MCMBs were utilized instead of natural graphite in the anode.

Evaluation Example 4: Battery Capacity Analysis

The full-cells prepared in Example 6 and Comparative Example 6 were charged under conditions of a temperature of about 25° C., a constant current of about 0.05 C, and a cut-off voltage of about 10 mV, and then discharged under conditions of a temperature of about 25° C., a constant current of about 0.05 C, and a 0.1 C cut-off voltage to measure capacities of the batteries. The results of the capacity measurement are shown in Table 4.

Figure 4:
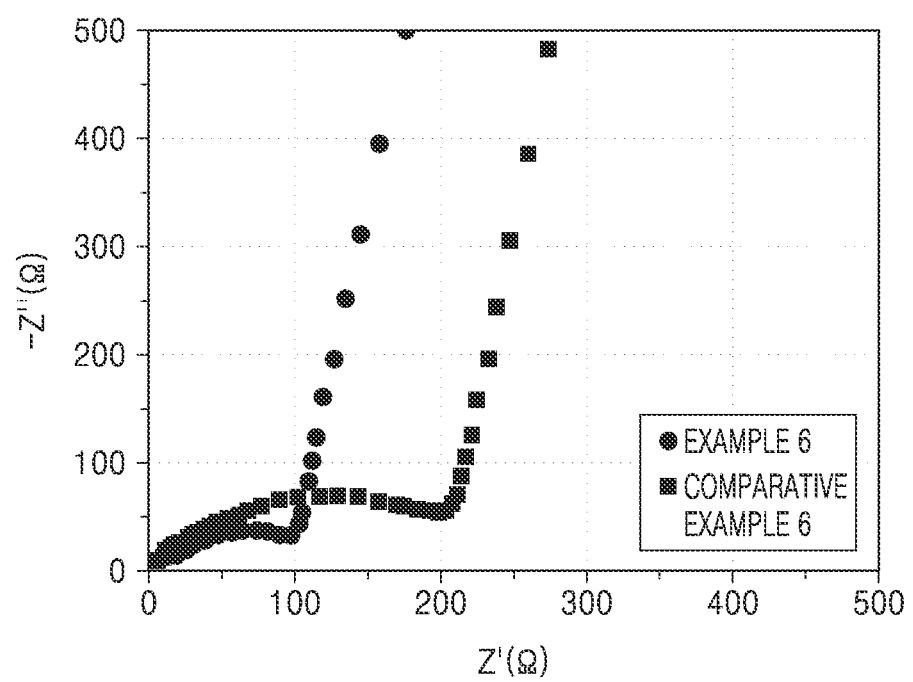
FIG. 4 is a graph (Nyquist plot) showing the results of measurement of interfacial resistance of batteries of Example 6 and Comparative Example 6.

The results of measuring interfacial resistances utilizing an electrochemical impedance spectroscopy EIS (Solartron) are shown in FIG. 4.

Figure 5:
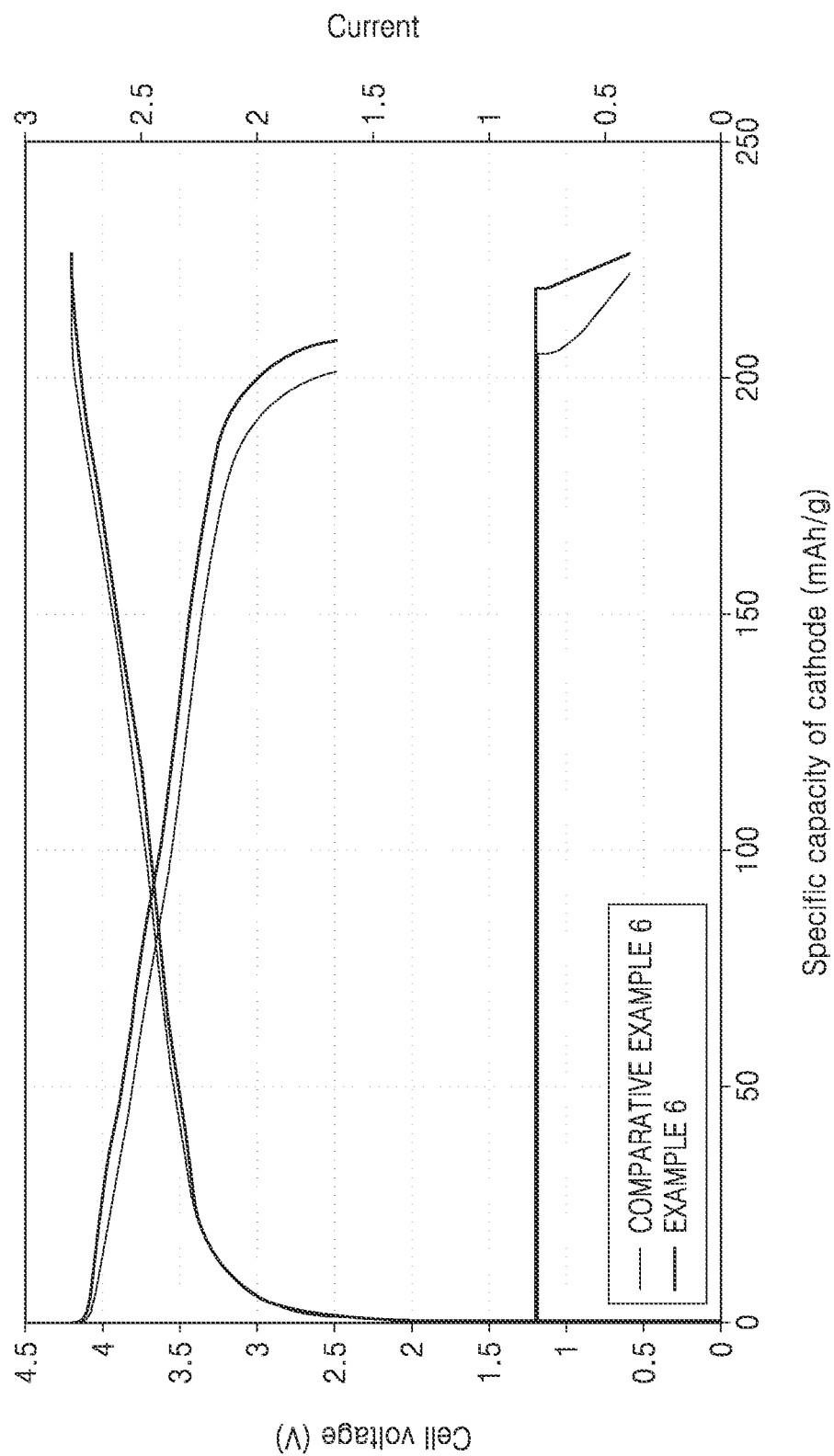
FIG. 5 is a graph showing the charging/discharging characteristics (voltage-capacity curves) of the batteries of Example 6 and Comparative Example 6.

The capacities of the batteries were measured utilizing a charger/discharger, and a charge/discharge graph is shown in FIG. 5.

TABLE 4

|  | 1$^{st}$ charge capacity (mAh/g) | 1$^{st}$ discharge capacity (mAh/g) | Efficiency (%) |
| --- | --- | --- | --- |
| Example 6 | 226.4 | 208.0 | 91.9 |
| Comparative Example 6 | 222.5 | 201.4 | 90.6 |

Evaluation Example 5: Lifespan Characteristics

As one cycle, the full-cells prepared in Example 6 and Comparative Example 6 were charged under conditions of a temperature of about 25° C., a constant current of about 0.1 C, 4.2 V (CC/CV), and a 0.025 C cut-off, and then discharged under conditions of a temperature of about 25° C., a constant current of about 0.1 C, 2.5 V (CC), and a 2.5 V cut-off. This cycle was repeated.

Figure 6:
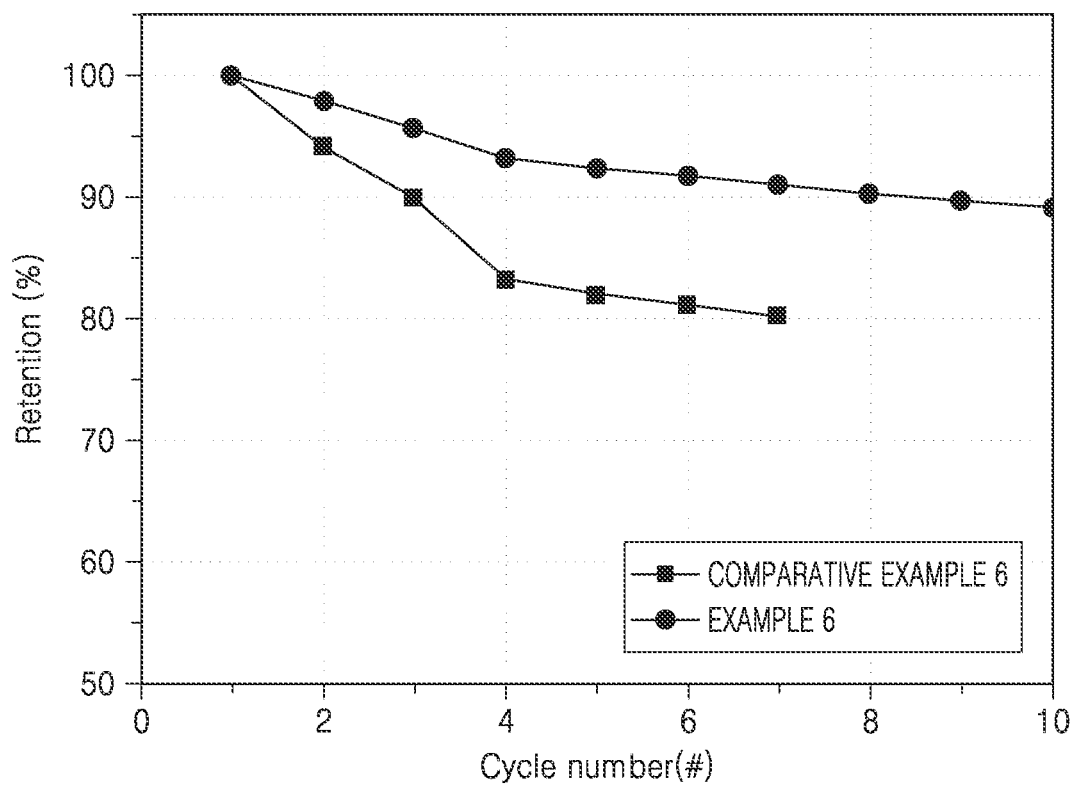
FIG. 6 is a graph showing the lifespan characteristics of the batteries of Example 6 and Comparative Example 6.

Changes in lifespan retention rate (%) according to the repetition of the cycle are shown in FIG. 6.

Example 7: Preparation of Li—In Half-Cell Utilizing Natural Graphite Having Limited Aspect Ratio Natural graphite having an aspect ratio of 1 was coated with carbon black having a concentration of about 3% utilizing a chemical vapor deposition (CVD) method.

60 mg of the natural graphite, 5 mg of carbon nanofibers (CNFs), and 30 mg of a sulfide-based solid electrolyte were mixed, and thus natural graphite coated with carbon black was obtained as an anode mixture.

An electrolyte layer was prepared in a torque cell utilizing 100 mg of the sulfide-based solid electrolyte, and 10 mg of the anode mixture was evenly spread on the electrolyte layer.

A lithium indium (Li—In) alloy having a thickness of about 70 μm was placed as a counter electrode on the opposite side, and a pressure of 40 kN was applied thereto to prepare a Li half-cell.

Reference Example 1

A half-cell was prepared in substantially the same manner as in Example 7, except that natural graphite having an aspect ratio of about 0.67 was utilized instead of the natural graphite described.

Reference Example 2

A half-cell was prepared in substantially the same manner as in Example 7, except that artificial graphite (MCMBs) having an aspect ratio of about 0.76 was utilized instead of the natural graphite described.

Evaluation Example 6: Torque Cell Capacity Analysis

The half-cells prepared in Example 7 and Reference Examples 1 and 2 were charged under conditions of a temperature of about 25° C., a constant current of 0.05 C, and a cut-off voltage of −0.61 V, and then discharged under the conditions of temperature of 25° C., a constant current of 0.05 C, and a cut-off voltage of 1.41 V. This charging and discharging cycle was repeated 2 times.

The results of torque cell capacities of the batteries measured utilizing a charger/discharger after the 2$^{nd}$ cycle are shown in Table 5.

TABLE 5

|  | Torque cell capacity (mAh/g, Li—In half-cell) |
| --- | --- |
| Example 7 | 263 |
| Reference Example 1 | 194 |
| Reference Example 2 | 85 |

According to an aspect of one or more embodiments, an all-solid secondary battery may have reduced interfacial resistance between graphite and a solid electrolyte by utilizing graphite, which is a material capable of stably absorbing and desorbing lithium, as an anode, and thus the battery may have excellent battery capacity characteristics.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that various suitable changes in form and details may be made therein without departing from the spirit and scope of the disclosure as defined by the following claims and equivalents thereof.

What is claimed is:

1. An all-solid secondary battery comprising:
   a cathode;
   an anode comprising natural graphite and a binder having a glass transition temperature ($T_g$) higher than about −55° C.; and
   a solid electrolyte layer between the cathode and the anode,
   wherein the natural graphite has an average particle diameter (D50) in a range of greater than about 10 μm to about 20 μm or less, and comprises an amorphous carbon coating layer,
   wherein a pellet density of the natural graphite is about 1.9 g/cm$^3$ or higher,
   wherein an aspect ratio of the natural graphite is greater than 0.5 and less than 1 or greater than 1 and less than 2,
   wherein the natural graphite is an amount of about 50 wt % or more based on a total weight of the anode,
   wherein the solid electrolyte layer comprises a sulfide-based solid electrolyte,
   wherein the sulfide-based solid electrolyte in the solid electrolyte layer is an argyrodite solid electrolyte comprising at least one selected from among $Li_6PS_5Cl$, $Li_6PS_5Br$, and $Li_6PS_5I$.

2. The all-solid secondary battery of claim 1, wherein the natural graphite comprises spherical graphite secondary particles comprising an assembly of flake graphite primary particles.

3. The all-solid secondary battery of claim 1, wherein the average particle diameter (D50) of the natural graphite is in a range of about 14 μm to about 20 μm.

4. The all-solid secondary battery of claim 1, wherein an aspect ratio of the natural graphite is in a range of about 0.5 to less than 1 or in a range greater than 1 to about 2.

5. The all-solid secondary battery of claim 1, wherein an aspect ratio of the natural graphite is in a range of about 0.7 to less than 1 or in a range of greater than 1 to about 1.4.

6. The all-solid secondary battery of claim 1, wherein the binder comprises styrene butadiene rubber (SBR).

7. The all-solid secondary battery of claim 1, wherein the anode further comprises a solid electrolyte.

8. The all-solid secondary battery of claim 7, wherein an average particle diameter (D50) of the solid electrolyte is in a range of about 0.1 μm to about 3 μm.

9. The all-solid secondary battery of claim 7, wherein the solid electrolyte is a sulfide-based solid electrolyte.

10. The all-solid secondary battery of claim 9, wherein the sulfide-based solid electrolyte is at least one selected from $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive integer, and Z is one of Ge, Zn, or Ga), $Li_2S$—$GeS_2$, $Li_2S$—$SiS_2$—$Li_3PO_4$, $Li_2S$—$SiS_2$-$Li_pMO_q$ (where p and q are each a positive integer, and M is one of P, Si, Ge, B, Al, Ga, or In), $Li_{7-x}PS_{6-x}Cl_x$ (where 0≤x≤2), $Li_{7-x}PS_{6-x}B_x$ (where 0≤x≤2), and $Li_{7-x}PS_{6-x}I_x$ (where 0≤x≤2).

11. The all-solid secondary battery of claim 9, wherein the sulfide-based solid electrolyte is an argyrodite solid electrolyte comprising at least one selected from $Li_6PS_5Cl$, $Li_6PS_5Br$, and $Li_6PS_5I$.

12. The all-solid secondary battery of claim 11, wherein a density of the argyrodite solid electrolyte is in a range of about 1.5 g/cc to about 2.0 g/cc.

13. The all-solid secondary battery of claim 1, wherein the anode is free of conducting material other than the natural graphite.

14. The all-solid secondary battery of claim 1, wherein:
   the anode comprises a solid electrolyte, and
   the solid electrolyte in the anode and the solid electrolyte in the solid electrolyte layer are identical to or different from each other.

15. A method of preparing the all-solid secondary battery of claim 1, the method comprising:
   providing the cathode;
   proving the anode comprising the natural graphite;
   providing the solid electrolyte layer between the cathode and the anode to prepare a stack; and
   pressing the stack.

16. The method of claim 15, wherein the pressing of the stack is performed at a temperature in a range of about 20° C. to about 90° C. and a pressure of about 550 MPa or lower.

* * * * *

UNITED STATES PATENT AND TRADEMARK OFFICE
CERTIFICATE OF CORRECTION

PATENT NO. : 12,095,039 B2
APPLICATION NO. : 17/249237
DATED : September 17, 2024
INVENTOR(S) : Jinkyu Kim et al.

Page 1 of 1

It is certified that error appears in the above-identified patent and that said Letters Patent is hereby corrected as shown below:

In the Claims

In Column 20, Line 25, in Claim 10, delete "$Li_{7-x}PS_{6-x}B_x$" and insert -- $Li_{7-x}PS_{6-x}Br_x$ --.

Signed and Sealed this
Eighteenth Day of February, 2025

Coke Morgan Stewart
*Acting Director of the United States Patent and Trademark Office*